United States Patent [19]
Sather

[11] 3,960,447
[45] June 1, 1976

[54] LOCATING AND LOCKING MECHANISM FOR GLASS FLAT
[75] Inventor: Eugene Sather, Deerfield, Ill.
[73] Assignee: Bell & Howell Company, Chicago, Ill.
[22] Filed: Nov. 15, 1974
[21] Appl. No.: 524,301

[52] U.S. Cl. ................................................. 355/75
[51] Int. Cl.² ......................................... G03B 27/62
[58] Field of Search ..................... 355/75, 64, 23, 24

[56] References Cited
UNITED STATES PATENTS
2,073,304  3/1937  Hopkins ............................... 355/75
2,691,321  10/1954  Jones et al. ........................ 355/75 X Primary Examiner—Richard A. Wintercorn
Attorney, Agent, or Firm—Robert A. Walsh

[57] ABSTRACT

A mounting for a glass plate which is adapted to be disposed in the scanning zone of a microfilm recording machine of a type which is particularly designed for processing documents, such as, for example, bank checks, and which comprises a transport system including spaced pairs of infeed and outfeed rollers with light, mirror and camera arrangements for photographing the documents onto a microfilm while they pass through the scanning zone formed by the gap between the pairs of feed rollers, the plate being positioned so as to provide a document supporting surface which insures that each document is presented to the scanning zone within a focal plane of the camera so as to achieve high resolution and the mounting being in the form of a guide block or plate mounted at one side or end of the scanning zone with a guideway formation in which the plate is adapted to be moved and with a slot arrangement and a latch spring adapted to cooperate with a pin on the plate assembly for turning the plate and locking it in the proper position while enabling ready manual removal and replacement.

15 Claims, 7 Drawing Figures

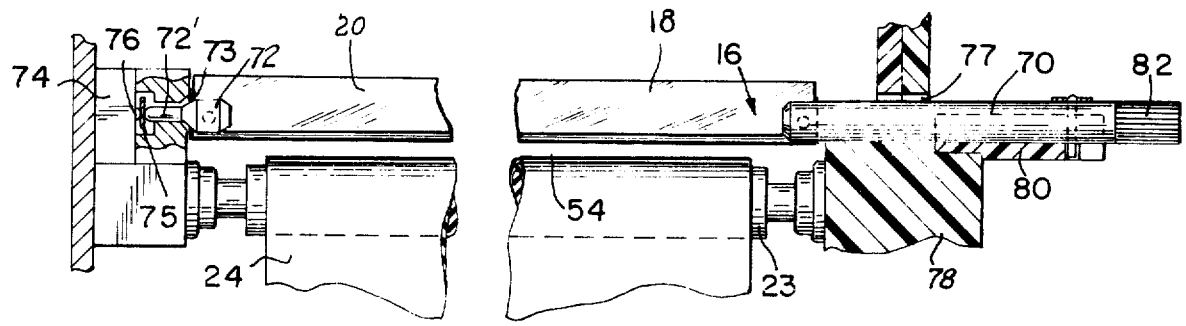
FIG_3_
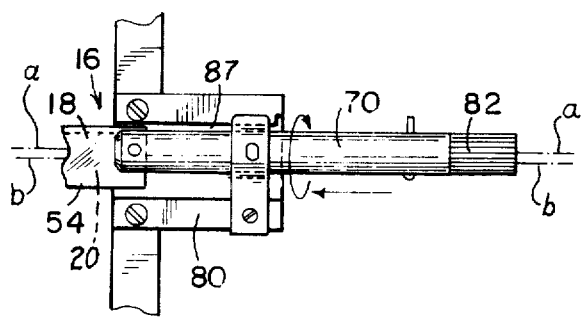
FIG_4_
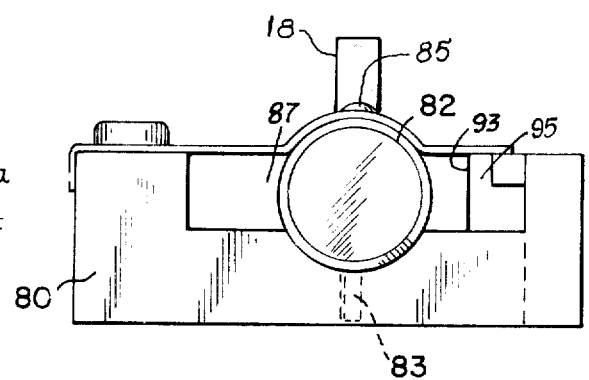
FIG_5_
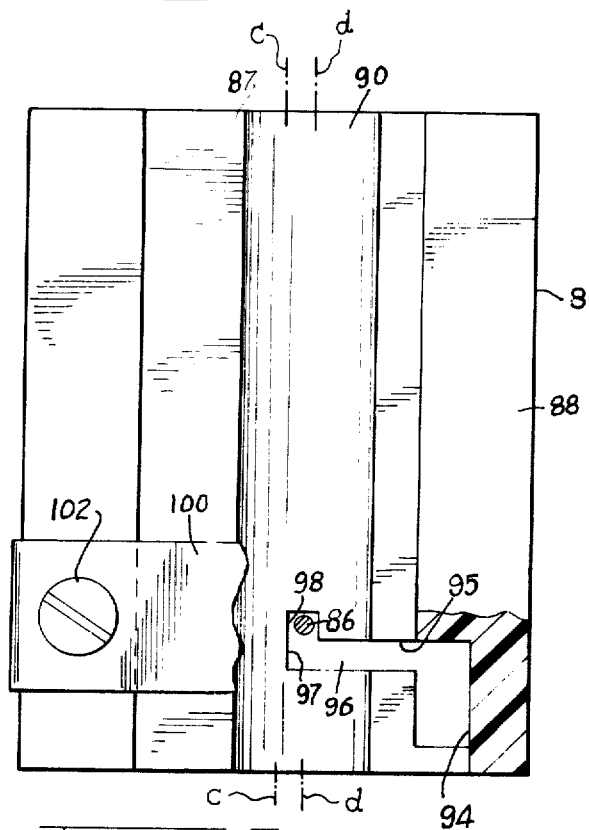
FIG_7_
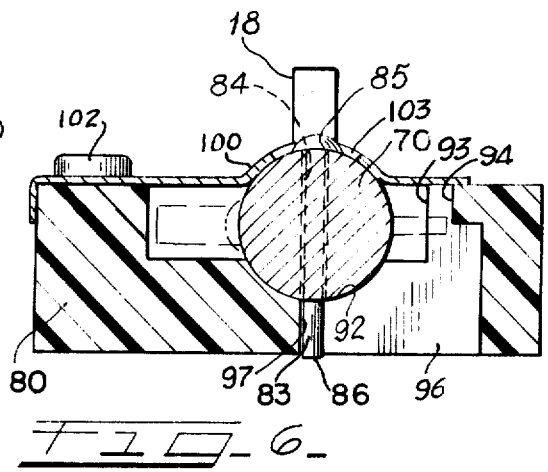
FIG_6_

LOCATING AND LOCKING MECHANISM FOR GLASS FLAT

BACKGROUND OF THE INVENTION

The present invention relates to microfilm recording machines of the type which are adapted to photograph on both sides, simultaneously, documents such as bank checks, or the like, which are transported through the machine, and is particularly concerned with improvements in the arrangements for supporting the documents in the scanning zone where the photographing occurs.

Microfilm recording machines are well known and have been found useful in many document processing operations, such as, for example, photographing bank checks, drafts and the like, in banking operations so as to maintain a record of each document for reference when needed. One general type of rotary recording machine of this character includes a document input feed mechanism on one side of a scanning zone into which the documents are fed and a document exit mechanism on the opposite side by means of which the documents are expelled and stacked, with the documents being presented in the scanning zone to a scanning photographic camera and associated mirrors, enabling the camera to make a photographic reproduction of both sides of each document, simultaneously. In order to operate the machine at a relatively high rate, each document must be presented to the scanning zone in a controlled and efficient manner so as to avoid wedging or jamming and to insure that the document is within a focal plane of the camera in order to achieve high resolution.

Two basic types of transport systems have been employed, heretofore. In one system pairs of transport rollers are spaced so that the gap between them provides an unobstructed view of the document within the scanning zone where it is unsupported. In a second system a pair of glass plates are interposed between the transport rollers so as to provide a channel in which each document is transported through the scanning zone. Both of these systems have proven deficient in maintaining adequate focal plane control of the documents. In the first system there is a lack of proper support for the document during its passage through the scanning zone while in the second system the plates must be spaced apart a sufficient distance to accommodate thick or partially mutilated documents with the result that effective confinement of comparatively thin documents in an optimum focal plane is not achieved. The open gap arrangement and the double glass plate arrangement are both deficient in controlling the flow of documents through the scanning zone resulting in excessive document jamming and throw-out through the gap opening in the first system and in the second system, jamming by overly thick or mutilated documents which become wedged in the relatively small space provided between the glass plates. Other objectionable features in the two-glass plate system include a lack of satisfactory arrangements for cleaning the glass surfaces when dust or other objectional material accumulates and cleaning becomes necessary.

A new and improved recording machine is described in the application Ser. No. 524,300 filed concurrently herewith on Nov. 15, 1974, which employs a transport system in which there is provided in the scanning zone a single glass plate upon a vertical face of which the documents are caused to rest as they are transported through the scanning zone thereby obtaining maximum focal plane control with minimum risk of jamming. In the development of the new machine the need for accurate positioning of the document supporting surface has been recognized and it is a general object of the present invention to provide a mounting arrangement for the document supporting glass plate which insures that the document supporting surface is always in the predetermined focal plane of the machine when the machine is operating while permitting ready withdrawal and reinsertion of the document supporting plate for cleaning and repair or replacement.

A more specific object of the invention is to provide in a rotary recording machine especially adapted for use in microfilm recording of documents, such as, bank checks, drafts, or the like, a single glass plate document supporting assembly mounting enables the glass plate and associated supporting or mounting elements to be manually withdrawn from the machine for cleaning or repair and thereafter returned to proper operating position with provision for guiding the glass plate into exactly the same position in the scanning zone and with provision for releasably retaining the plate against displacement when guided into operative position.

A still more specific object of the invention is to provide a mounting for a document supporting glass plate assembly which is adapted to be removably positioned in a recording machine of the type which is especially adapted for recording on microfilm both sides of a bank check or similar document simultaneously, and which employs a document transporting system having a transport mechanism for feeding documents through a scanning zone where the successive documents are caused to lie on the supporting surface of a glass plate which is within a focal plane of the recording camera, which glass plate assembly is supported at one end, when in operative position in the machinne, on a guide pllate member having guide recesses in which the plate assembly rides and also recesses which cooperate with a projecting portion of the plate assembly for guiding the assembly into and/or out of the machine, indexing the assembly into proper position for the glass plate when inserted and finally releasable locking the assembly against rotational and axial movement when fully inserted in proper document supporting position in the machine.

Another object of the invention is to provide in a microfilm recording machine having a document scanning zone with a document supporting glass plate assembly which is removable and replaceable, a mounting for the glass plate assembly which enables ready removal and insertion of the glass plate assembly laterally of the machine and which includes a grooved support plate cooperating with portions or the assembly in guiding the assembly during insertion and rotation near the end of the inserting movement so as to position the face of the plate for proper support of the documents, followed by further inserting movement in an axial direction which triggers a safety switch and seats the assembly for cooperation with a spring latch member on the support plate so as to hold the assembly against any retractive or rotational movement during operation of the machine.

BRIEF DESCRIPTION OF THE DRAWINGS

These and other objects of the invention will be apparent from a consideration of the form of the apparatus which is shown by way of illustration in the accompanying drawings wherein:

FIG. 3 is a cross sectional view taken on the lines 3—3 of FIG. 2 with portions broken away;

FIG. 4 is a fragmentary view taken on the line 4—4 of FIG. 3 but with the glass plate assembly in a partially inserted or partially withdrawn position;

FIG. 5 is a fragmentary end elevational view, to an enlarged scale, the view being taken on the line 5—5 of FIG. 2 and showing the outermost end of the mounting block for the glass plate assembly;

FIG. 6 is a cross sectional view to an enlarged scale, the view being taken on the line 6—6 of FIG. 2; and FIG. 7 is a plan view to an enlarged scale showing the top face of the mounting block for the glass plate assembly, with portions broken away.

DESCRIPTION OF THE PREFERRED EMBODIMENT

Figure 1:
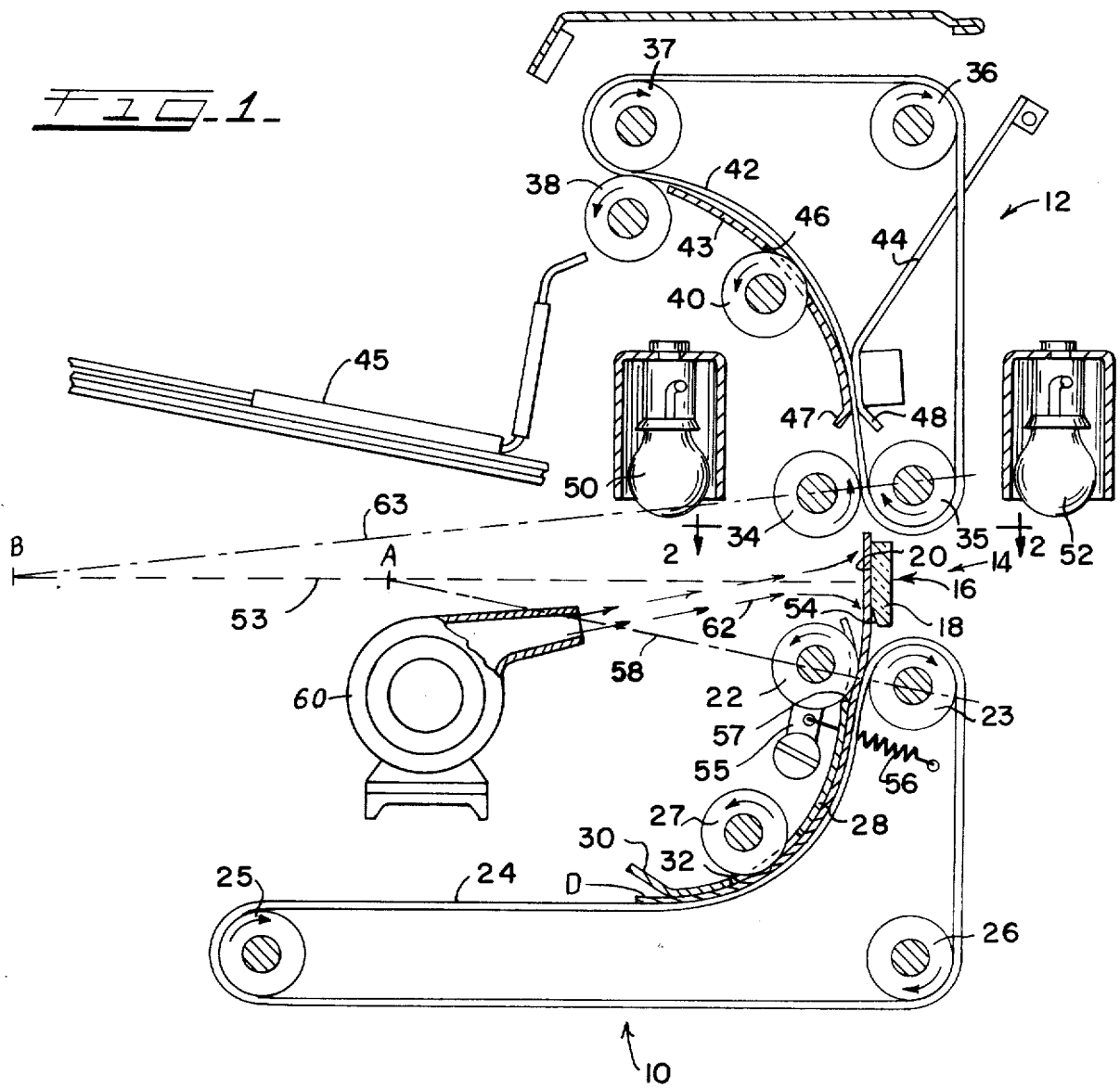
FIG. 1 is a partial side view in largely schematic form of a microfilm recording machine having a scanning zone in which there is provided a single glass plate for supporting the documents which is mounted in accordance with the principles of the invention.

Referring first to FIG. 1 of the drawings there is illustrated in partially schematic form, a microfilm recording machine having a document supporting single glass plate assembly mounted in the document scanning zone which embodies the present invention. For details of the machine not herein described resort may be had to the application, Ser. No. 524,300 filed concurrently herewith and to U.S. Pat. No. 3,342,100 granted Sept. 19, 1967 both of which are assigned to the assignee of the present invention.

The illustrated microfilm recording machine includes a document transporting arrangement comprising an input feed mechanism 10 and a document discharge mechanism 12 with a gap between the two mechanisms 10 and 12 which constitutes a scanning zone 14 in which there is mounted a glass plate document supporting assembly 16 having a single glass plate member 18 disposed, when in operative position, in a vertical plane and bridging the gap or scanning zone 14, with a vertical face 20 with supports and guides and documents within the predetermined focal plane of the machine as they are advanced across the scanning zone 14.

The input feed mechanism 10 includes a pair of cooperating transport rollers 22 and 23 mounted at the entrance side of the scanning zone 14 adjacent the lowermost edge of the glass plate member 18, an endless belt 24 mounted on a plurality of drive rollers 25, 26 and 27 and a guide plate 28. The belt 24 is looped about the drive rollers 25, 26 and the one transport roller 23, with the drive rollers adapted to rotate in the direction of the associated arrows. The guide plate 28 has a flange 30 at the entrance end which provides a relatively wide funnel-like opening for insertion of a document D between the guide plate 28 and the belt 24. The guide plate 28 is curved to feed a document D from a substantially horizontal position to a substantially vertical position by the time it reaches the transport rollers 22 and 23. The guide roller 27 is received in an opening 32 in the guide plate 28 and cooperates with the belt 24 in advancing a document placed on the belt.

The document exit or discharge mechanism 12 includes a pair of cooperating transport rollers 34 and 35 mounted at the exit side of the scanning zone 14 adjacent the topmost edge of the glass plate member 18, a plurality of drive rollers 36, 37, 38 and 40, an endless belt 42, guide plate 43, guide bracket 44 and a hopper 45. The belt 42 is looped about the one transport roller 35 and the drive rollers 36 and 37 with the rollers being adapted to rotate in the direction of the associated arrows so as to transport a document from the scanning zone 14 to the hopper 45. The guide plate 43 is curved as shown and cooperates with the belt 42 in forming a channel to guide each document between the transport rollers 34, 35 and the cooperating ejecting rollers 37 and 38 leading to the hopper 45. The guide plate 43 and guide bracket 44 have flanges 47 and 48 at the entrance edge portions which cooperate to form an enlarged opening for receiving the documents to be exited from the machine.

The glass plate assembly 16 is mounted in the scanning zone between the document input feed mechanism 10 and the document exit mechanism 12 and provides support and guidance for the documents while the documents are photographed on both sides simultaneously. As well known, when a document enters the scanning zone it is illuminated by lights 50 and 52 and is scanned by a camera on both sides through coaction of a plurality of mirrors to provide a reproduction on microfilm of both sides of each document fed through the machine. The mounting for the lights, the camera and associated mirrors, which are omitted in the drawings, are shown and fully described in U.S. Pat. No. 3,342,100.

The glass plate 18 is positioned for operation with the document supporting major longitudinal surface portion 20 lying substantially within the predetermined focal plane of the machine and with a transverse axis 53 extending forward from the major surface 20. The glass plate 18 includes a minor surface portion 54 along the lower margin adjacent the transport rollers 22 and 23 which is integral with the surface portion 20 and inclined relative thereto and in the direction of transport roller 23.

The transport rollers 22 and 23 cooperate in feeding a document into the scanning zone 14. The roller 22 is carried on a pivotal arm 55 and biased in the direction of roller 23 by spring 56, and into contacting relation with the belt 24 through an opening 57 in the guide plate 28. The rollers 22 and 23 are mounted so that the nip they form for engaging each document is forward of the glass plate major surface 20 and the plane, indicated at 58, which embraces their axes of rotation intersects the transverse axis 53 at A. This results in the leading edge of each document transported through rollers 22 and 23 being directed toward and against the longitudinal major surface 20 of glass plate 18. A fan 60 generates a column of air flow 62 which is directed towards the major surface 20 of the glass plate member 18 and assists in holding each document flat aginst the surface 20 as it is being scanned by the photographic camera. The minor surface portion 54 of plate 18 is provided to assure that the leading edge of each document assumes the proper position against the major plate surface 20.

The transport rollers 34 and 35 are mounted to cooperate in forming a nip for engaging each document as it leaves the scanning zone 14 with the nip being forward of the major plate surface 20 and the plane 63 which embraces the axes of rotation of the rollers 34 and 35 converging on the transverse axis 53 and intersecting the latter at B which results in the trailing portion of each document being directed against the major plate surface 20 as it leaves the scanning zone. The transport arrangement insures adequate control of the passage of the documents through the transport zone against the supporting surface 20 afforded by the properly positioned single glass plate member 18.

The glass plate assembly 16 (FIGS. 2 to 6) is constructed and mounted so as to enable the assembly 16 to be readily inserted in or withdrawn from the machine and, when the plate 18 is properly positioned in the scanning area 14, to be locked or latched in the correct position for supporting and guiding the documents within a focal plane of the photographic camera. The glass plate assembly 16 includes a relatively long, narrow, rectangular glass plate or strip member 18, with an elongate cylindrical rod member 70 forming a handle member at one end and a mounting pin member 72 at the other end. The plate member 18 is of sufficient length to extend the required width in the scanning zone 14. The handle 70 and pin member 72 are mounted on or secured to the ends of the glass plate member 18, the end of the plate member being set in a diametrical slot in the end of the cylindrical handle member and in the cylindrical pin mounting. The handle 70 and pin 72 are mounted so as to extend along an aligned axis indicated at $a—a$ in FIG. 4 of the plate member 18 in a plane parallel with and offset a short distance from the long bottom edge of the plate which is adjacent the minor face portion 54 and below the central longitudinal axis of the plate member 18 indicated at $b—b$ in FIG. 4. The handle and pin member mounting portion each have a cross sectional diameter greater than the thickness of the glass plate and the end of the glass plate 18 is set in the diametrical slots so that a portion of the handle and pin member mounting extends along and is outside the plane of the plate face on each of its sides or faces.

Figure 2:
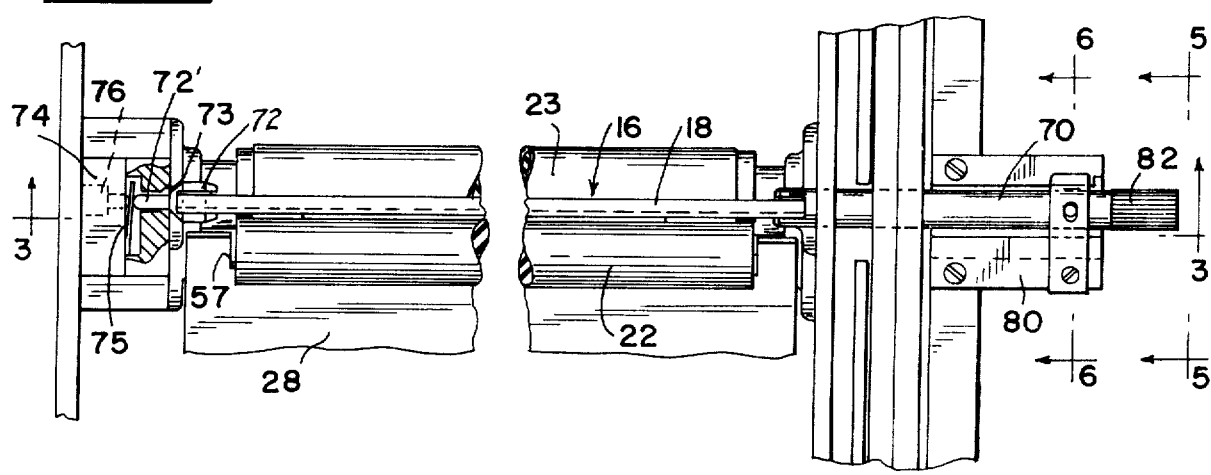
FIG. 2 is a cross sectional view taken on the line 2—2 of FIG. 1 with portions broken away, the view showing the mounting for the document supporting glass plate assembly.

As seen in FIGS. 2 and 3, when the plate assembly 16 is in the proper operative position in the machine the pin member 72 has a free end portion 72' of reduced cross section which is seated in a horizontal bore 73 in a mounting block or bracket 74 on the inside wall of the machine and engages a switch actuating element 75 of a safety switch, indicated at 76, which may be connected into the electrical operating circuit so as to permit operation of the machine only when the assembly 16 is inserted and in proper operating position.

The handle member 70 at the other end of the plate member 18 extends through an aperture 77 in the side wall 78 and is supported on a block or plate member 80 which is constructed to serve also as a guide member for proper positioning of the plate assembly 16 and which has associated latch elements for releasably locking or latching the assembly 16 in the required position for proper operation of the machine. The handle member 72 has a knurled end at 82 for better gripping during insertion and withdrawal of the assembly. The handle member 72 has a headed pin member 83 fixed in a diametric cross bore 84 with a conical head portion 85 protruding and forming a latch button on the one side of the handle member and with the end 86 extending at the diametrically opposite side of the handle member. The axis of the bore 84 and the axis of the pin 83 are in the plane of the plate member 18 and the pin cooperates with elements of the guiding and supporting block member 80 to form guiding, indexing and latching means, enabling ready insertion and withdrawal of the assembly 16 and for holding the assembly 16 latched or locked in fully inserted and properly indexed position in the machine.

The supporting and guiding or guideway forming block 80 for the plate assembly 16 is mounted in a suitable manner on the one side wall 78 of the machine and projects outwardly of the machine as shown in FIGS. 2 and 3, a sufficient distance to provide an adequate top support surface for guiding the assembly while it is being inserted. The block 80 (FIGS. 2 to 7) has an upwardly opening rectangular recess or groove 87 in the top face 88 which extends lengthwise of the block in a direction transverse of the machine. The recess 87 has a width and depth somewhat greater than the width and thickness, respectively, of the flat glass strip 18 so as to allow the glass 18 to slide freely in the groove or slot 87 when placed therein with flat side face 20 down as shown in FIG. 3. A further recess 90 in the bottom of the recess 87 has a cross sectional bottom curvature, indicated at 92 in FIGS. 5 and 6, corresponding to the curvature of the cylindrical handle member 70 and is of a depth sufficient to accomodate the portion of the handle which is outside the plane of the surface or face 20 of the flat glass strip 18. The longitudinal center line of the groove 90, indicated at $c—c$ of FIG. 7 is offset relative to the longitudinal center line $d—d$ of the glass plate accomodating recess 87 a distance corresponding sufficiently close to the offset relationship between the axis $a—a$ (FIG. 4) of the handle portion 70 and the longitudinal center line $b—b$ of the plate member 18 so as to fix the rotational position of the plate assembly 16 which will permit insertion of the assembly 16 in the groove or recess 87. That is, the assembly can be slid into the guide groove or recess 87 only when the face 20 of the plate member 18 is down which is the correct rotational position for subsequent rotation to the proper operative position of the plate 18. At the entrance end of the guide block 80 the wall 93 (FIGS. 5 to 7) which defines the one side of the recess 87 is cut away or slotted to provide a longitudinal guide groove 94 of a size to accommodate the projecting end 86 of guide pin 83 so as to permit a limited axial movement of the plate assembly 16 in the direction for further insertion of the assembly into the machine near the end of the inserting movement. The slot thus formed extends a relatively short distance into the guide plate 80 and terminates at a cross wall 95 which is in a vertical plane. A cross slot 96 extends vertically below the wall portion 95 which is of a size to permit passage of the pin end 86 when the handle member 70 is rotated in the groove 90 about a longitudinal axis and in a clockwise direction, as viewed in FIGS. 5 and 6. As indicated in FIG. 4 and in phantom line in FIG. 6, the plate assembly 16 is initially inserted in the guide groove or recess 87 with the face 20 of the plate 18 down, which aligns the guide pin portion 86 for entry into the horizontal slot 94. The vertical cross slot 96 extends to the bottom face of the guide plate and laterally to a vertical wall portion 97 which is located so as to position the guide pin end 86 for insertion in an axially extending vertical guide and indexing or latching slot 98 (FIG. 7) which is of relatively short axial extent and which permits final axial movement of the assembly 16 into final position, with the plate 18 in proper position vertically for the face 20 to support the documents within the focal plane of the camera. A small spring plate 100 is secured at one end by a screw 102, or other suitable fastening means, on the top face 88 of the guide plate 80 and extends across the guide recess 87. The spring plate 100 has an upwardly curved portion 103 conforming to the curvature of the surface of the handle 70 in which there is a small slot 104 of a size to permit the latch button 85 to seat therein when the assembly 16 is fully inserted and the guide pin 86 is seated in the axial slot 98. The latch spring member 100 is positioned to cooperate with the slot 98 in holding the assembly 16 against axial turning of the assembly and also to releasably hold the assembly against movement in an axial direction once the assembly is fully inserted. The spring member 100 also cooperates with the grooves 87 and 90 in forming the guideway for insertion of the glass plate assembly 16 since it spans the top of the recess 87.

The operation of the mounting means will be apparent from the foregoing description of the illustrated apparatus. The glass plate assembly is initially inserted by placing the pin end in the groove 90 with the face 20 of plate member 18 down and axially moving the assembly into the machine until the guide pin portion 86 strikes the wall 95, then rotating the assembly through 90° to align the pin 86 with the small slot 98 for a final axial movement which finally positions the glass plate in the proper vertical plane in the scanning zone with the end pin 72' seated in the bore 73 and triggering the safety switch 76 to place the machine in condition for operation.

I claim

1. In a microfilm recording machine of the type which makes a photographic reproduction of documents processed therethrough and which includes a document input feed mechanism, a document exit and a scanning zone between the input feed mechanism and exit wherein each document is scanned and photographed and in which there is disposed a single glass plate member with a flat glass face against which each document is caused to lie as it is transported through the scanning zone, a mounting means for said glass plate member which enables ready removal and replacement of said glass plate member, said mounting means including a support member in the form of a block mounted at one side of the machine and constructed to provide horizontally disposed upwardly opening guideway forming means for cooperation with portions of said glass plate member in supporting in sliding relation therein and glass plate member while it is moved into and/or out of operative position in the scanning zone.

2. In a microfilm recording machine as set forth in claim 1 wherein said glass plate member has a handle member on one end and an axially extending pin on the opposite end and wherein said mounting means for said glass plate member includes a support member mounted at the opposite side of the machine which is spaced from and aligned with said guideway forming means for receiving in supporting relation said glass plate end pin when said glass plate member is in operative position in the machine and has said handle member at said opposite end supported by said guideway forming means.

3. In a microfilm recording machine of the type which makes a photographic reproduction of documents processed therethrough and which includes a document input feed mechanism, a document exit and a scanning zone between the input feed mechanism and exit wherein each document is scanned and photographed and in which there is disposed a glass plate assembly with a flat glass face against which each document is caused to lie as it is transported through the scanning zone, a mounting means for said glass plate assembly which enables ready removal and replacement of said glass plate assembly, said mounting means including a support member mounted at one side of the machine and constructed to provide horizontally disposed guideway forming means for cooperation with portions of said glass plate assembly in supporting said glass plate assembly while it is moved into and/or out of operative position in the scanning zone, said guideway forming means receiving in supporting relation an end portion of said glass plate assembly when said glass plate assembly is in operative position in the machine and has an opposite end portion supported by said guideway forming means, and said mounting means having an associated switch for controlling the operation of the machine which is actuated by said glass plate assembly when said glass plate assembly is supported by said mounting means in operative position in the machine, enabling the machine to be operated only when said glass plate assembly is supported in operative position.

4. A microfilm recording machine of the type which makes a photographic reproduction of documents processed therethrough and which includes a document input feed mechanism, a document exit and a scanning zone between the input feed mechanism and exit wherein each document is scanned and photographed and in which there is disposed a glass plate assembly with a flat glass face against which each document is caused to lie as it is transported through the scanning zone, a mounting means for said glass plate assembly which enables ready removal and replacement of said glass plate assembly, and mounting means including a support member mounted at one side of the machine and constructed to provide horizontally disposed, guideway forming means which extends in a direction to guide said glass plate assembly as it is moved axially into the machine and transversely of said axial direction so as to cooperate with guide means on said glass plate assembly in enabling the glass plate assembly to be supported while it is moved in an axial direction into and/or out of operative position in the scanning zone and to be rotated about its axis to a predetermined position for proper document engagement of the glass face when the assembly is inserted in the machine.

5. In a microfilm recording machine of the type which makes a photographic reproduction of documents processed therethrough and which includes a document input feed mechanism, a document exit and a scanning zone between the input feed mechanism and exit wherein each document is scanned and photographed and in which there is disposed a glass plate assembly comprising a single glass plate assembly member with a flat glass face against which each document is caused to lie as it is transported through the scanning zone, a mounting means for said glass plate assembly which enables ready removal and replacement of said glass plate assembly, said mounting means including a support member in the form of a block mounted at one side of the machine and having upwardly opening, horizontally disposed guideway forming means for cooperation with portions of said glass plate assembly in supporting said glass plate assembly while it is moved into and/or out of operative position in the scanning zone, which guideway forming means is constructed so as to provide guideway formations of a size and shape relative to the size and shape of the glass plate assembly to permit insertion of the assembly in said guideway formations when the assembly is in one perdetermined, axially rotated position only and thereafter to axially rotate said assembly to a predetermined operative position so as to insure proper location of said flat glass face in said scanning zone.

6. In a microfilm recording machine as set forth in claim 5 wherein said guideway forming means includes latching elements cooperating with portions of said glass plate assembly in releasably holding said assembly in predetermined non-rotatable position when fully inserted in operative position in the machine.

7. In a microfilm recording machine of the type which makes a photographic reproduction of documents processed therethrough and which includes a document input feed mechanism, a document exit and a scanning zone between the input feed mechanism and exit wherein each document is scanned and photographed and in which there is disposed a glass plate assembly with a flat glass face against which each document is caused to lie as it is transported through the scanning zone, which glass plate assembly comprises an elongate relatively narrow flat glass plate having an elongate cylindrical member forming a handle member mounted at one end and a pin member of relatively small cross section mounted in axial alignment with the handle member at the other end, a mounting means for said glass plate assembly which enables ready removal and replacement of said glass plate assembly, said mounting means comprising a guideway forming plate member mounted at one side of the machine and having upwardly opening guide recesses extending in a direction across the machine which recesses are constructed to receive in sliding relation said flat glass plate and portions of the handle member and pin members which project beyond the plate member flat surfaces so as to support said glass plate assembly and to guide the glass plate assembly in a path across the machine while said glass plate assembly is moved into and/or out of predetermined operative position in the document scanning zone.

8. In a microfilm recording machine as set forth in claim 7 wherein said guide recesses are of a size and shape relative to the size and shape of said glass plate and its associated handle member and pin member to enable the assembly to be positioned for sliding movement in the recess in only one predetermined position of axial rotation of said glass plate assembly.

9. In a microfilm recording machine as set forth in claim 7 wherein said cylindrical handle member has a radially projecting guide pin disposed in a transverse plane and said guideway forming plate member has a transversely extending slot intermediate the ends of the guideway recesses for accommodating said guide pin so as to enable said glass plate assembly to be rotated about a longitudinal axis when it is partially inserted in the machine to position said plate member in a predetermined vertical plane in said scanning zone.

10. In a microfilm recording machine as set forth in claim 7 wherein said cylindrical handle member has a latching button member protruding from its cylindrical surface and said guideway forming plate member has a flat spring latch member spanning the open top of said guideway forming recesses for cooperation with said button member in releasably latching said glass plate assembly when said glass plate assembly is in predetermined position in said scanning area.

11. In a microfilm recording machine as set forth in claim 1 wherein said support member has guideway forming means for cooperation with said glass plate member enabling sliding insertion and axial rotation of said glass plate member into position in the machine so as to place the flat glass face in predetermined position in the scanning zone for supporting the documents as they are transported through the scanning zone and wherein said support member has a resilient latch member for engaging in latching relation a portion of said glass plate member when said glass plate member is fully inserted in operative position in the machine 12. In a microfilm recording machine of the type which makes a photographic reproduction of documents processed therethrough and which includes a document input feed mechanism, a document exit and a scanning zone between the input feed mechanism and exit wherein each document is scanned and photographed and in which there is disposed a document support plate assembly with a support plate member having a flat face against which each document is caused to lie as it is transported through the scanning zone, which support plate assembly comprises an elomgate relatively narrow flat support plate member having an elongate cylindrical member forming a handle member mounted at the other end and a mounting means for said support plate assembly which enables ready removal and replacement of said support plate assembly, which mounting means comprises a support means for said support plate assembly disposed at one side of the machine and constructed to provide guideway forming means for co-operation with portions of said support plate assembly in supporting and guiding said support plate assembly while it is moved into and/or out of position in the scanning zone and in supporting at least one end of said support plate assembly when it is seated in operative position in said scanning zone, said guideway forming means comprising recesses extending in a direction across the machine which recesses are constructed to receive in sliding relation said document support plate member and portions of the handle member and pin forming members which project beyond the plate member surfaces so as to guide the support plate assembly in a path across the machine and into predetermined position in the document scanning zone.

13. In a microfilm recording machine as set forth in claim 12 wherein said guideway forming means comprises recesses of a size and configuration relative to the size and configuration of said support plate member and its associated handle member and pin member to enable said support plate assembly to be positioned for sliding movement in the recesses in only one predetermined position relative to the long axis of said support plate assembly.

14. In a microfilm recording machine as set forth in claim 12 wherein said cylindrical handle member has a radially projecting guide pin disposed in a transverse plane and said guideway forming means includes a transversely extending slot intermediate the ends of said guideway forming recesses for accommodating said guide pin so as to enable said support plate assembly to be rotated about a longitudinal axis when it is partially inserted in the machine to position the flat face of said document support member in a predetermined plane in said scanning zone.

15. In a microfilm recording machine as set forth in claim 14 wherein cylindrical handle member has a latching button member protruding from its cylindrical surface and said guideway forming means has a spring latch member associated with said guideway forming recesses for cooperation with said button member in releasably latching said support plate assembly against movement out of predetermined position in said scanning area.

* * * * *